(12) United States Patent
Söderkvist et al.

(10) Patent No.: US 6,987,750 B2
(45) Date of Patent: Jan. 17, 2006

(54) METHOD AND APPARATUS FOR EVALUATING A TIMESLOT IN A TDMA SIGNAL

(75) Inventors: Jan Söderkvist, Enebyberg (SE); Peter Wahlström, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/831,035

(22) Filed: Apr. 23, 2004

(65) Prior Publication Data

US 2004/0196814 A1  Oct. 7, 2004

Related U.S. Application Data

(63) Continuation of application No. 09/467,707, filed on Dec. 20, 1999, now Pat. No. 6,771,628.

(51) Int. Cl.
*H04B 17/02* (2006.01)
*H04B 7/212* (2006.01)
*H04Q 7/00* (2006.01)

(52) U.S. Cl. ............... 370/337; 370/332; 370/329; 455/134; 455/135

(58) Field of Classification Search ............ 370/337, 370/329, 332, 333, 341, 347, 442, 459, 252, 370/462, 334; 455/115.3, 134, 135
See application file for complete search history.

(56) References Cited

U.S. PATENT DOCUMENTS

| | | | |
|---|---|---|---|
| 5,594,949 A * | 1/1997 | Andersson et al. | 455/437 |
| 5,898,730 A * | 4/1999 | Hensley et al. | 375/224 |
| 6,115,367 A * | 9/2000 | Archambaud et al. | 370/334 |
| 6,256,477 B1 * | 7/2001 | Eidson et al. | 455/63.3 |
| 6,266,528 B1 * | 7/2001 | Farzaneh | 455/423 |
| 6,275,486 B1 * | 8/2001 | Edwards et al. | 370/347 |
| 6,404,826 B1 * | 6/2002 | Schmidl et al. | 375/340 |
| 6,442,143 B1 * | 8/2002 | Corry | 370/252 |
| 6,697,626 B1 * | 2/2004 | Eidson et al. | 455/452.1 |
| 6,771,628 B1 * | 8/2004 | Soderkvist et al. | 370/337 |

* cited by examiner

*Primary Examiner*—Hanh Nguyen

(57) ABSTRACT

A method and apparatus for evaluating interference within a timeslot of a received TDMA signal is described. An average received signal strength is calculated for a plurality of repeating segments within a TDMA timeslot. The segment sizes are dependent upon the efficiency of the error correction coding scheme utilized by a selected channel type. The calculated received signal strengths for the plurality of the segments are applied to a lowpass filter. The output of the lowpass filter is processed to determine the level of interference within the timeslot.

20 Claims, 4 Drawing Sheets

METHOD AND APPARATUS FOR EVALUATING A TIMESLOT IN A TDMA SIGNAL

CROSS-REFERENCE TO RELATED APPLICATIONS

This application is a continuation of U.S. patent application Ser. No. 09/467,707 filed on Dec. 20, 1999 now U.S. Pat. No. 6,771,628, the disclosure of which is incorporated herein by reference.

BACKGROUND

The present invention relates to interference measurements within timeslots of a TDMA signal, and more particularly, to a method for evaluating a timeslot based upon an amount of interference within the timeslot.

In order to insure the quality of voice communications over a cellular communications network, the system must avoid cellular calls from being established on disturbed channels containing a level of interference that would degrade the quality of the calls to an unacceptable level. Interference in timeslots can be caused by co-channel interference from another transmitter sending on the same frequency but in another cell. The co-channel interferers are not necessarily slot-synchronized with the TDMA transmitters in this cell. In order to evaluate the disturbed channels, the interference level on selected channels must be measured to enable an estimation of how much the interference level would affect the quality of the call. The interference level on the downlink channels is difficult for the base station to check, unless specified means are included in the standard. The interference level on the uplink channels can be measured at the base station by monitoring received power levels in idle timeslots, i.e., timeslots not used by any mobile connected to that base station. This problem is more fully described in PCT application No. WO 97/31501, which is incorporated herein by reference.

Within analog systems, such as analog AMPS where one RF carrier is dedicated to one mobile station, a straightforward method for making this determination involves measuring and lowpass filtering the received signal strength on idle channels for each analog channel. For TDMA systems, the process is more complicated because interference supervision must be done for each timeslot. This problem is more fully illustrated in FIG. 1 which illustrates an exemplary scenario where an uplink channel frequency is divided into three timeslots 5, 10, 15 of which timeslot one 5 and timeslot two 10 are occupied by a first and a second transmitting mobile stations respectively, connected to the base station transceiver. Timeslot three 15 is idle and is disturbed by a co-channel interferer on the same frequency from a third transmitter in another cell. It will be noted that the interference provided by the co-channel interferer actually occurs over timeslots two 10 and three 15. This is because the second transmitter is not time synchronized/slot synchronized with the timeslots of the receivers for the present base station.

Existing methods of evaluating idle timeslots for e.g., determining whether or not co-channel interference should prevent the assignment of a call to a timeslot involve determining an average interference level for the entire timeslot. Since the unsynchronized interference does not occur over the entire time period of timeslot three 15, a determination may be made that the average interference level in timeslot three is low enough to permit a new call to be set up on the timeslot, even though the first portion of the timeslot is severely disturbed by the co-channel interference. This would present a serious problem for certain types of connections since the channel protection (forward error correction coding) may be weak, and the loss of even a few bits on the air interface may mean loss of the entire slot.

This problem arises because the average interference level determinations are made over the entire timeslot period while significant amounts of interference are only introduced in small portions of the timeslot. The problem is accentuated if those small portions contain critical information, such as bits used for error correction. Thus, prior art system have difficulty handling cases where unsynchronized strong interferers affect only portions of a timeslot since the slotwise interference averages will not give a true picture of the quality of the mobile station to base station voice connection provided by the timeslot at all points within the timeslot. Thus, some way for measuring timeslot interference that reflects the true impact of interference throughout the timeslot is desired.

SUMMARY

The present invention overcomes the foregoing and other problems with a method and apparatus for evaluating an idle timeslot within a TDMA signal by detecting interference within the timeslot. The interference is detected by measuring the received signal strength of disturbing signals. Initially, a channel type is selected and a segment or segment size is selected for a plurality of segment average calculations which will be performed throughout the TDMA timeslot. The size of the segment is dependent upon the efficiency of the error correction coding scheme used by the TDMA signal of the selected channel type. Alternatively, the selected segment size may vary within the timeslot depending upon the importance of information contained within particular portions of the timeslot. For example, larger segment sizes may be utilized where non-important information will be transmitted at the beginning of a timeslot, and smaller segments utilized with the more important following information.

Within each of a plurality of segments defined by the selected segment size throughout the timeslot, an average received signal strength is calculated. At least one of the calculated values of the average received signal strength from the plurality of calculated average received signal strengths is selected and input to a lowpass filter. The output of the lowpass filter may be compared to a selected threshold level to enable a determination of whether the idle timeslot interference is low enough to enable a connection utilizing the timeslot. If the filtered average received signal strength output by the lowpass filter exceeds a selected threshold value, an alternative slot must be selected for the connection. If the selected threshold value is not exceeded, the timeslot may be used for a call connection. Alternatively, the interference information may be stored for further analysis e.g., for supporting network optimization.

BRIEF DESCRIPTION OF THE SEVERAL VIEWS OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
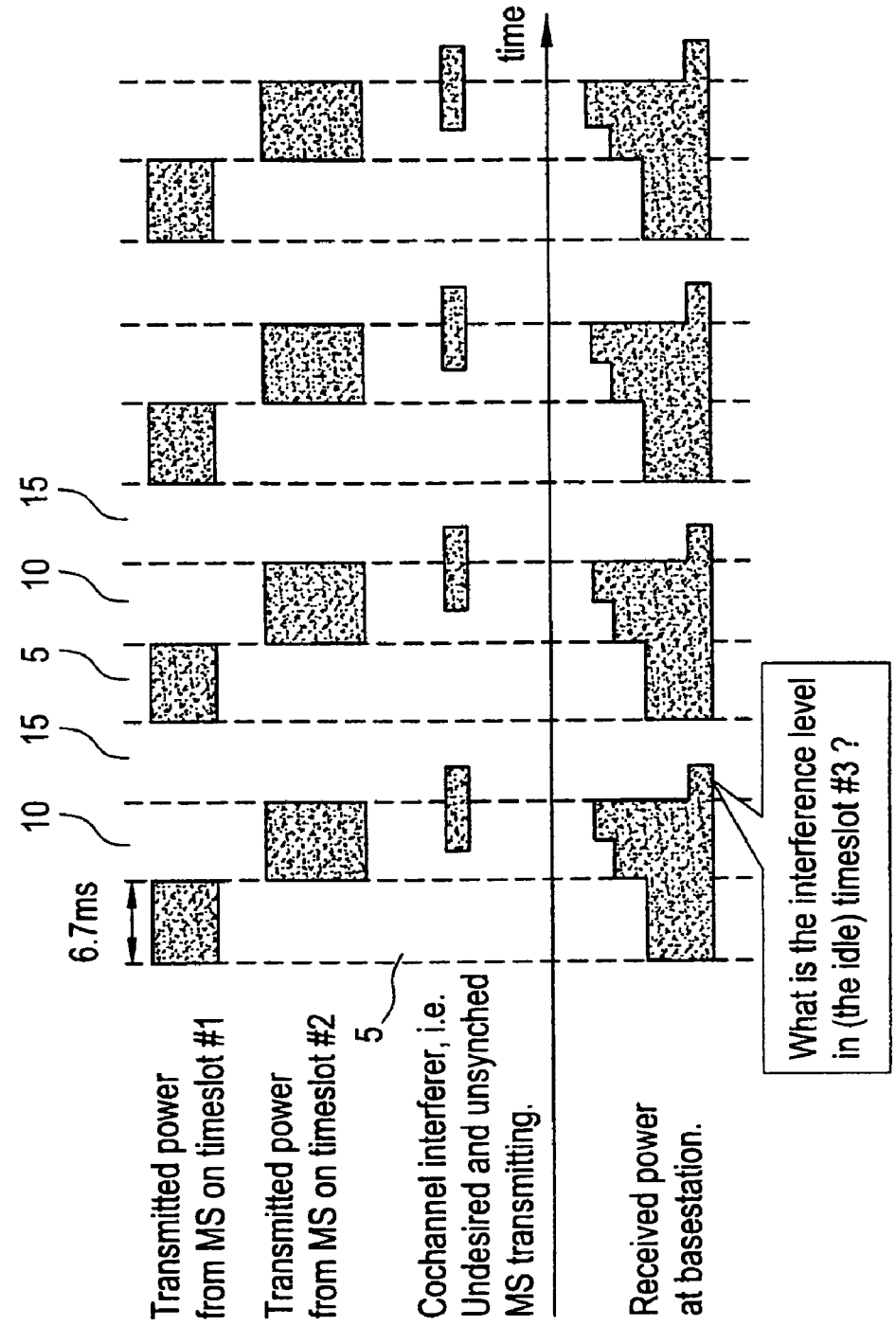
FIG. 1 is an illustration of received power and co-channel interference on a particular frequency at a base station.
Figure 2:
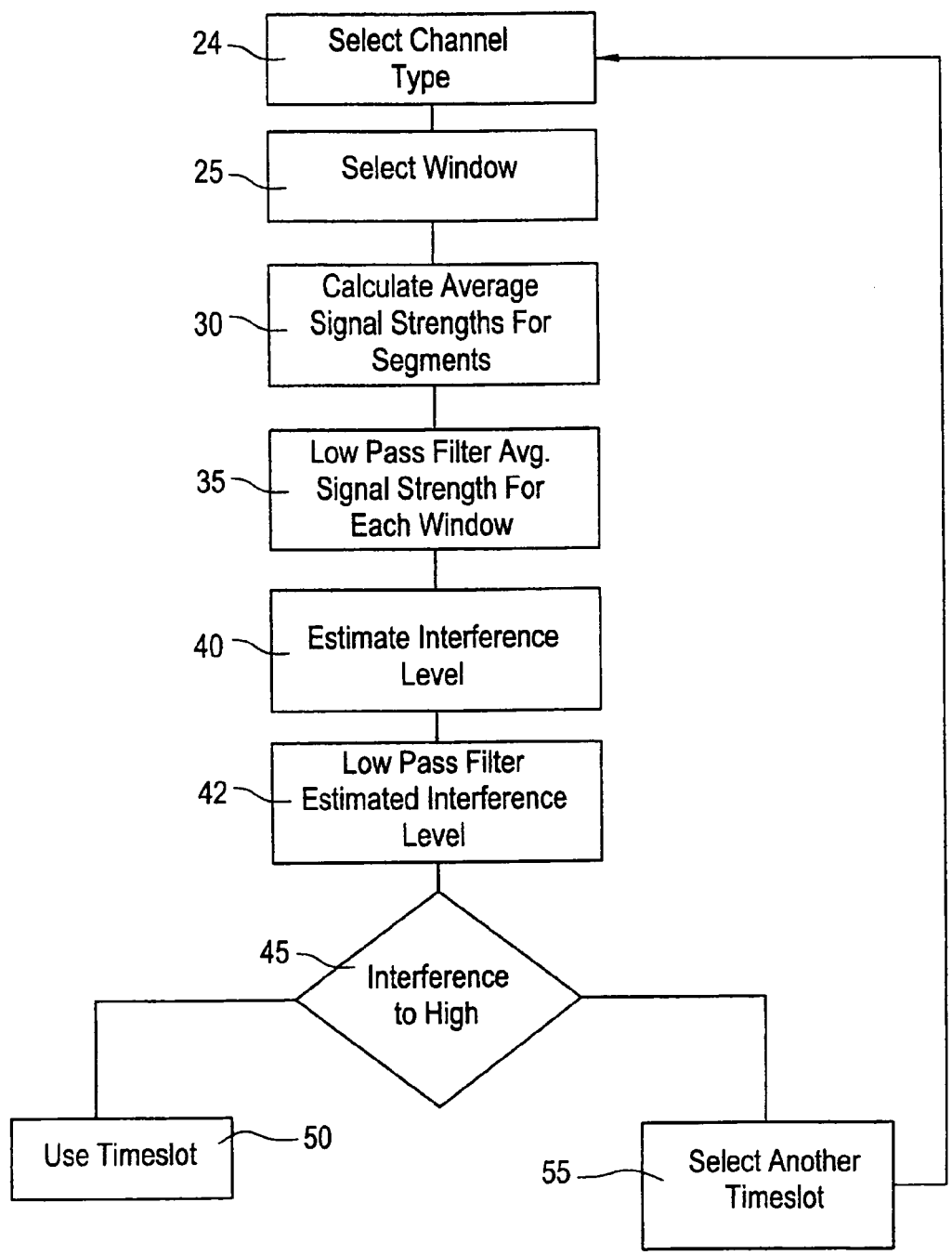
FIG. 2 is a flow diagram illustrating the method of the present invention.

Referring now to the drawings, and more particular to FIG. 2, there is illustrated a flow diagram describing the method for detecting the interference level within a particular timeslot and determining whether the interference level is high enough to render the timeslot unusable for a call connection (i.e., a disturbed timeslot). Initially, a channel type is selected at step 24 so that the modulation, channel coding and error correction of the channel are known. Based upon the selected channel type, a segment size for performing a plurality of average calculations over the timeslot is selected at Step 25. The segment size for the average calculations is selected dependent upon the strength of the error correcting code used for the transmissions from the mobile station to the base station. A strong channel coding scheme, for example, IS136 ACELP, could use a larger segment since the error correcting coding scheme may correct a large number of errors within a received signal. A typical segment size, suitable for a slot containing ACELP speech encoded and channel encoded information is 15 symbols (approximately 0.6 ms). A weaker channel coding scheme, for example, IS136 RLP1, would require the use of a smaller segment for the average calculations because less errors are able to be corrected by the coding scheme. Thus, the peak areas of interference throughout smaller portions of the timeslot must be determined.

Figure 3A:
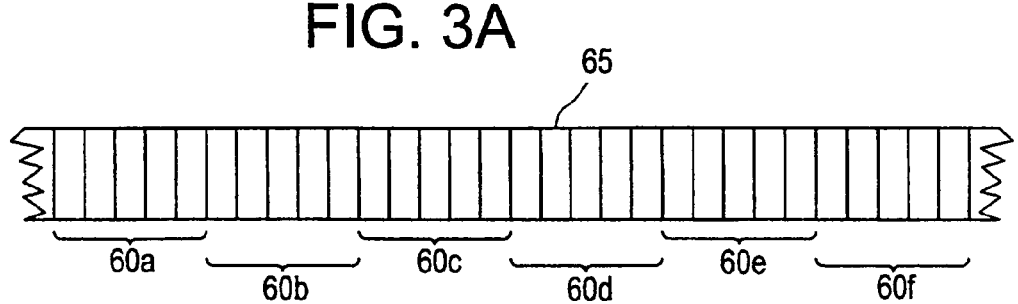
FIGS. 3A–3D illustrate various embodiments of the segment described with respect to FIG. 2.
Figure 3B:
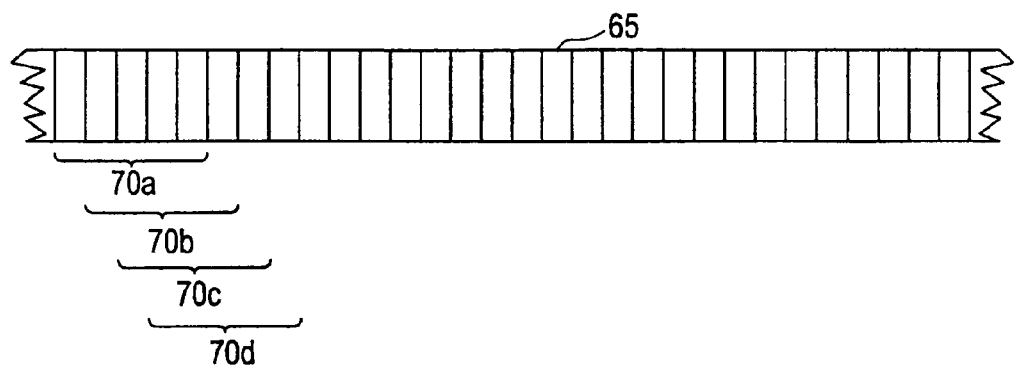

Next, an average of the received signal strength is calculated at Step 30 for each segment defined by the selected segment size over the entire timeslot period (in IS136 approximately 6.7 ms). Alternatively, the average can be calculated over a selected part of the timeslot period. The segments may be selected in a number of ways as illustrated in FIGS. 3A–3D. In FIG. 3A, an average of the received signal strength (received power) is determined for multiple separate segments 60a–60f of the timeslot 65. Thus, for example, if the segment size 60 was 5 symbols long, an average of received signal strength would be determined for the first 5 symbols 60a (1–5), the second 5 symbols 60b (6–10), the third 5 symbols 60c (11–15), and so forth until the end of the timeslot 65 was reached. Alternatively, as illustrated in FIG. 3B, a sliding window may be used by progressively moving the segment 70 through the timeslot 65 designating multiple overlapping segments. In this case, again assuming a 5 symbol segment 70, an average of the received signal strength over symbols 1–5 (70a) would be determined. Next an average of the received signal strength for symbols 2–6 (70b), 3–7 (70c), 4–8 (70d) and s forth would be determined until the end of the timeslot 65 was reached.

Figure 3C:
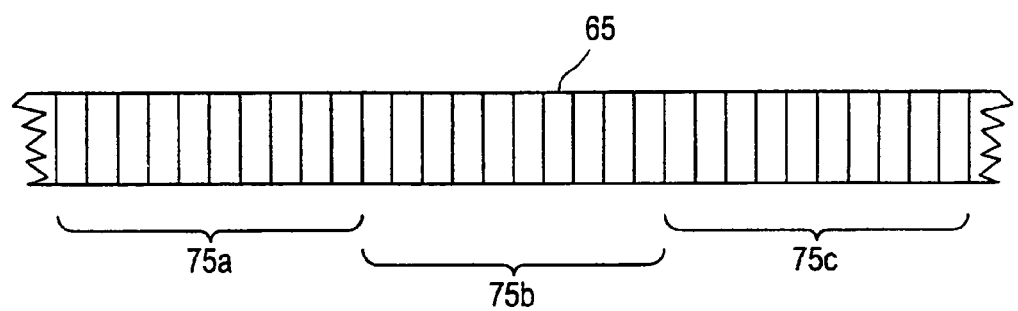
Figure 3D:
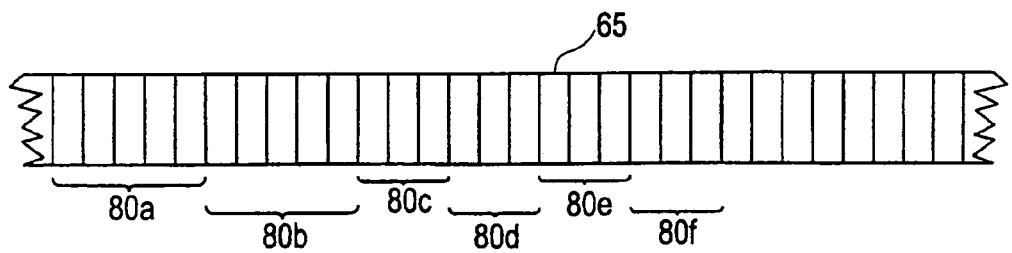

Additional variations in segment sizes, illustrated in FIGS. 3C and 3D, may also be used in response to the type of coding scheme used within the received signal and the structure of the timeslot 65 (i.e., the selected channel type). For stronger coding schemes, the size of the segment 75 may be increased as illustrated in FIG. 3C. Alternatively, as shown in FIG. 3D, different segment sizes 80 may be used in different parts of the timeslot 65. For example, in some channel coding schemes, the first portion of the timeslot 65 may be less important than the middle portion of the timeslot. Therefore, in the first portion of the timeslot 65 a larger segment size 80a, 80b may be used since interference within the first area does not create severe problems with the call connection, while a segment size 80c–80f within the following portions of the timeslot 65, containing the more important data, may be smaller to ensure detection of whether the interference level is too high, adversely affecting a call connection.

The determination of average signal strengths is repeated periodically and the resulting values are lowpass filtered for each segment. As will be more fully described in FIG. 4, several average signal strengths for several segments are determined at one time. Each of the lowpass filtered average signal strengths for each segment is then used to estimate an interference level at Step 40. This process may be carried out in a number of methods and two particular embodiments are described below with respect to FIG. 4. The estimated interference level is lowpass filtered at Step 42. Alternatively, or in addition, the estimated interference level may be stored for further analysis, such as network optimization.

At inquiry Step 45, the output of the lowpass filter is checked to determine if the filtered average signal strength is above a preselected level. The preselected level may be fixed or vary responsive to a number of factors including, but not limited to, the capability of the mobile station, the current load in the cell (higher congestion implies that a higher level of interference may be accepted) and the modulation technique to be used. If the average signal strength does not exceed the preselected level, the timeslot is not sufficiently disturbed to prevent its use for a call connection, and the timeslot may be used at Step 50. If the filtered average signal strength exceeds the preselected level, an alternative timeslot must be selected at Step 55, and the above process is repeated to determine if the newly selected timeslot is satisfactory to support a call connection.

Figure 4:
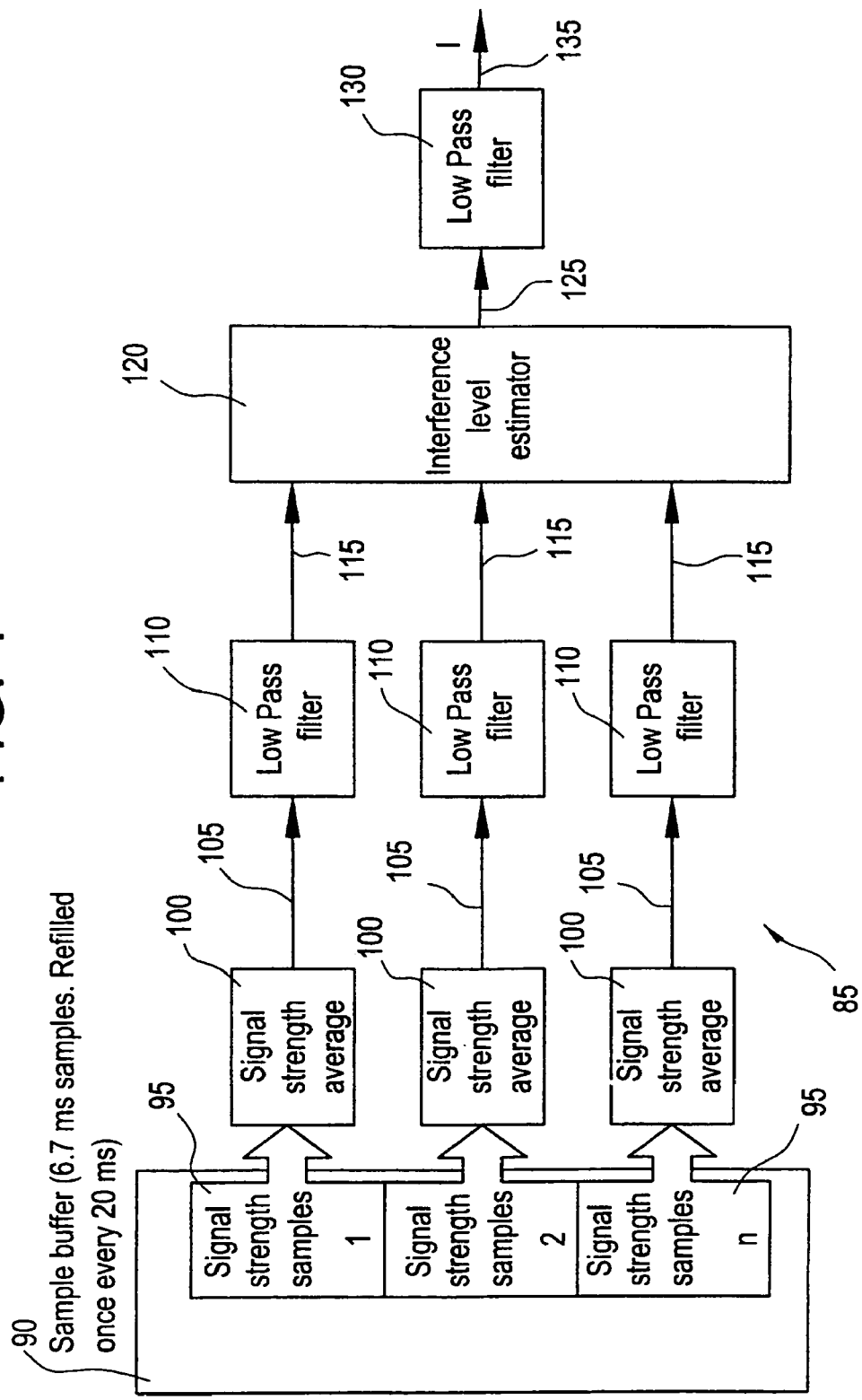
FIG. 4 is a functional block diagram of an apparatus for performing the method of the present invention.

Referring now to FIG. 4, there is illustrated a block diagram of an apparatus for estimating the interference levels as part of the idle slot supervision method described in FIG. 2. The interference level estimating apparatus 85 includes a sample buffer 90 which stores digitized samples of the received signal strength within a plurality of segments 95. The sample buffer 90 contains segments 95 for one timeslot (6.67 ms) and is refilled with new data once every 20 ms. The various signal samples from the segments 95 are transmitted to average RSS calculation logic units 100 which determine an average received signal strength for the samples contained within particular segments. A new calculation takes place within the average RSS calculation logic units 100 for each new update of the buffer 90, i.e., once every 20 ms. There is a separate average RSS calculation logic unit 100 for each segment 95 within the sample buffer 90. The segments 95 within the sample buffer 90 may be of different sizes or even overlapping as discussed earlier with respect to FIG. 3.

Each average RSS calculation logic unit 100 provides an output value each 20 ms. This value is provided to a lowpass filter 110. The lowpass filter 110 removes the fast random variations (greater than 0.5 Hz) in the average received signal strength of the segments caused by fading (e.g., Rayleigh fading). Each lowpass filter 110 may be implemented as a simple first order lowpass filter with a time constant in the order of 1 to 2 seconds. The output of the lowpass filter 110 is a slow varying (less than 0.5 Hz) signal strength value 115 for the associated segment 95.

The slow varying signal strength value 115 for each segment 95 is input to interference level estimator logic 120. The interference level estimator logic 120 processes the outputs from each of the lowpass filters 110 and outputs an estimated interference level 125. The interference level estimator 120 may be implemented in a number of ways. Two alternative methods are proposed below. However, it should be realized by one skilled in the art that the invention is not limited to these particular implementations.

In a first alternative, a simple "peak find" method may be used. In this method, the outputs of the lowpass filters 110 are examined and a current maximum value S4 is determined according to the equation $$S4 = \underset{i=1\ldots N}{\text{MAX}}(\alpha_i \bullet S3_i)$$

where: N=number of segments the slot has been divided into;

$S3_i$=filtered RSS average for segment number i; and $\alpha_i$—weighting factor for segment number i. The weighting factor is chosen depending on the relative importance of the bits inside that particular segment for a selected channel type.

A second alternative works under the principle that any co- or adjacent channel interference within the segment is likely caused by other TDMA transmitters using bursts with the same length as the slot being checked. However, interferers are not slot synchronized with the checked slot and will either interfere at the beginning or ending of the slot. Since it is not known how far into the slot, either from the beginning or from the end of the slot, the interference stretches, the following equation may be used as an edge detection feature for determining how far the interfering signals extends within the checked timeslot. Thereby, only the disturbed part of the timeslot may be included in the calculations.

$$S4 = \text{MAX}\left(\underset{n=1\ldots N}{\text{MAX}}\left(\frac{\sum_{i=1}^{n}\alpha_i S3_i}{\sum_{i=1}^{n}\alpha_i}\right), \underset{N=1\ldots N}{\text{MAX}}\left(\frac{\sum_{i=1}^{n}\alpha_{N-i}S3_{N-i}}{\sum_{i=1}^{n}\alpha_{N-i}}\right)\right)$$

If all $\alpha=1$, e.g., if all segments are equally important, then this equation can be simplified to:

$$S4 = \text{MAX}\left(\underset{n=1\ldots N}{\text{MAX}}\left(\frac{1}{n}\sum_{i=1}^{n}S3_i\right), \underset{N=1\ldots N}{\text{MAX}}\left(\frac{1}{n}\sum_{i=1}^{n}S3_{N-i}\right)\right)$$

which can be expanded into:

$$S4 = \text{MAX}(X_0, X_1, X_2, \ldots, Y_0, Y_1, Y_2, \ldots)$$

where;

$$X_0 = S3_0$$

$$X_1 = \text{MAX}\left\{S3_0, \frac{1}{2}(S3_0 + S3_1)\right\}$$

$$X_2 = \text{MAX}\left\{S3_0, \frac{1}{2}(S3_0 + S3_1), \frac{1}{3}(S3_0 + S3_{1+} + S3_2)\right\}$$

$$Y_0 = S3_N$$

$$Y_1 = \text{MAX}\left\{S3_N, \frac{1}{2}(S3_N + S3_{N-1})\right\}$$

The output of the interference level estimator logic 120 can be stored for use as statistics in analyzing slot behavior, e.g., for supporting network optimization work, or for decisions on whether a timeslot may be used for calls (unusable timeslots are temporarily "sealed"). The output of the interference level estimator logic 120 will fluctuate due to slow fading and may cause oscillations in the system, e.g., slots jumping back and forth from "sealed". In order to prevent these oscillations of slots from sealed to unsealed status, a lowpass filter 130 is connected to the output of the interference level estimator logic 120. The time constant on the lowpass filter 130 is in the order of 10 seconds.

The response time for the entire interference estimation apparatus 85 is provided by the time constants of the lowpass filters 110 and 130 within the apparatus. The time constants of lowpass filters 110 and 130 may be selected depending upon the type of traffic within a particular cell (i.e., stationary mobiles, slow moving mobiles, highway moving mobiles). Other filter types may also be used, e.g., higher order lowpass filters, prediction filters, etc.

If the timeslot can carry traffic with differing requirements for interference levels, for example, within ACELP voice channels using strong channel coding or RLP1 encoded channels using weaker channel coding, different segment sizes and/or time constants of lowpass filters 110 and 130 may be needed for the different channel encoding schemes. In a typical IS136 system, the channel coding scheme to be used for a call, depending on different factors such as mobile station capability, is only known just prior to the call being setup. Thus, it is then too late to start measuring the interference levels of the timeslots. In order to overcome this problem, interference level estimations may be performed, for example, for both an ACELP encoded call and a RLP1 encoded call using a pair of interference level estimators 85. The estimators 85 will run in parallel whenever a timeslot is idle. Just prior to call setup the traffic control system (not shown) selects which output of an estimator 85 to use.

The previous description is of a preferred embodiment for implementing the invention, and the scope of the invention should not necessarily be limited by this description. The scope of the present invention is instead defined by the following claims.

What is claimed:

1. A method for evaluating timeslot of a received TDMA signal by estimating an interference level within the timeslot, comprising the steps of:
    calculating an average received signal strength for each of a plurality of repeating segments within the timeslot;
    estimating the interference level based on at least one of said calculated average received signal strengths,
    comparing the estimated interference level to a selected threshold level;
    establishing a connection on the timeslot if the interference level does not exceed the threshold level; and
    selecting another timeslot if the interference level exceeds the threshold level.

2. The method of claim 1 further comprising the step of selecting a channel type for the timeslot of the received TDMA signal.

3. The method of claim 2, further including the step of selecting a size for the plurality of repeating segments responsive to the selected channel type.

4. The method of claim 2 further including the step of selecting a plurality of sizes for the plurality of repeating segments, wherein the selected size of a segment is responsive to a position of the segment within the timeslot and the selected channel type.

5. The method of claim 1 further including the step of lowpass filtering the estimated interference level.

6. The method of claim 1 further including the step of lowpass filtering at least one of the calculated average received signal strengths.

7. The method of claim 1, wherein the step of calculating further comprises calculating a received signal strength for a plurality of overlapping, repeating segments.

8. The method of claim 1, wherein the step of calculating further comprises calculating a received signal strength for a plurality of sequential, repeating segments.

9. The method of claim 1, wherein the step of calculating further comprises applying a weighting factor for each of the segments.

10. The method of claim 1, wherein the step of selecting further comprises the steps of:
determining a portion of the TDMA timeslot subject to interference; and
determining an average value for the calculated received signal strengths within this portion.

11. A method for selecting a timeslot of a received TDMA signal for a connection, comprising the steps of:
selecting a segment size for a plurality of segment average calculations;
calculating an average received signal strength within each of a plurality of segments in the timeslot, said segments defined by the selected segment size;
lowpass filtering each of the calculated average received signal strengths;
estimating the interference level based on at least one of said calculated and filtered average received signal strengths;
lowpass filtering the estimated interference level;
comparing the interference level to a selected threshold level;
establishing a connection on the timeslot if the interference level does not exceed the threshold level; and
selecting another timeslot, if the interference level exceeds the threshold level.

12. The method of claim 11 further comprising the step of selecting a channel type for the timeslot of the received TDMA signal.

13. The method of claim 11, wherein the step of calculating further comprises calculating a received signal strength for a plurality of overlapping, repeating segments.

14. The method of claim 11, wherein the step of calculating further comprises calculating a received signal strength for a plurality of sequential, repeating segments.

15. The method of claim 11, wherein the step of calculating further includes the step of applying a weighting factor to each of the segments.

16. A method for estimating an interference level in a timeslot of a received TDMA signal for a connection, the method comprising:
dividing the timeslot into a plurality of segments;
measuring a received signal strength in each segment to determine a signal strength measurement;
saving the signal strength measurement for each segment in a sample buffer;
determining an average from the saved signal strength measurements in the sample buffer for repeating timeslots; and
comparing the average to a selected threshold level to estimate an interference level for the timeslot.

17. The method of claim 16, further comprising:
establishing a connection on the timeslot if the interference level does not exceed the threshold level; and
selecting another timeslot, if the interference level exceeds the threshold level.

18. The method of claim 16, further comprising lowpass filtering the average to estimate the interference level for the timeslot.

19. The method of claim 16, further comprising determining a peak value for the timeslot.

20. The method of claim 19, wherein the determining a peak value (S4) is determined according to an equation:

$$S4 = \underset{i=1...N}{\text{MAX}} (\alpha_i * S3_i)$$

where:
N = number of segments the timeslot has been divided into;
$S3_i$ = the RSS average for segment number i; and
$\alpha_i$ = weighting factor for segment number i.

* * * * *